United States Patent
Lorenz

Patent Number: 6,123,382
Date of Patent: Sep. 26, 2000

[54] SWIVEL DEVICE FOR A REAR WINDOW

[75] Inventor: Martin Lorenz, Metzingen, Germany

[73] Assignee: DaimlerChrysler AG, Stuttgart, Germany

[21] Appl. No.: 09/201,829

[22] Filed: Dec. 1, 1998

[30] Foreign Application Priority Data

Dec. 1, 1997 [DE] Germany .................. 197 53 209

[51] Int. Cl.⁷ ....................................................... B60J 1/10
[52] U.S. Cl. ............... 296/146.14; 296/201; 296/107.07; 296/147
[58] Field of Search ............... 296/201, 146.14, 296/107.07, 147

[56] References Cited

U.S. PATENT DOCUMENTS

| | | | |
|---|---|---|---|
| 4,168,859 | 9/1979 | Breitschwerdt et al. | 296/147 |
| 4,543,747 | 10/1985 | Kaltz et al. | 296/146.14 |
| 4,611,849 | 9/1986 | Trenkler | 296/201 |
| 4,620,746 | 11/1986 | Alexander | 296/201 |
| 4,693,509 | 9/1987 | Moy et al. | 296/201 |
| 4,715,647 | 12/1987 | Mynott et al. | 296/201 |
| 4,784,428 | 11/1988 | Moy et al. | 296/146.14 |
| 4,852,935 | 8/1989 | Varner | 296/146.14 |
| 5,209,544 | 5/1993 | Benedetto et al. | 296/146.14 |
| 5,246,262 | 9/1993 | Schrader et al. | 296/146.14 |
| 5,267,770 | 12/1993 | Orthe et al. | 296/107.07 |
| 5,489,354 | 2/1996 | Gold | 296/201 |
| 5,524,954 | 6/1996 | Gold | 296/201 |
| 5,542,735 | 8/1996 | Fürst et al. | 296/146.14 |
| 5,788,316 | 8/1998 | Rothe | 296/146.14 |
| 5,967,591 | 10/1999 | Muehlhausen | 296/147 |
| 5,988,729 | 11/1999 | Klein | 296/107.07 |

FOREIGN PATENT DOCUMENTS

| | | |
|---|---|---|
| 1 146 767 | of 0000 | Germany . |
| 196 35 537 | of 0000 | Germany . |
| 34 44 593 | 6/1986 | Germany . |
| 36 07 650 | 9/1987 | Germany . |
| 92 11 365 | 1/1994 | Germany . |

*Primary Examiner*—Joseph D. Pape
*Assistant Examiner*—Kiran Patel
*Attorney, Agent, or Firm*—Evenson, McKeown, Edwards & Lenahan, P.L.L.C.

[57] ABSTRACT

A vehicle has a folding roof extending between lateral vehicle columns, particularly A-columns and C-columns, a rear window and a vehicle body with a trunk. The rear window is releasably connected in its lower area by way of a swivel device with the vehicle body. The rear window can be deposited in the trunk by way of the swivel device. The rear window is connected by connection devices in its lateral area with the C-columns and/or in its upper area with the folding roof in a releasable manner. In the lower area of the rear window, a sealing device extending in the transverse direction of the vehicle is arranged between the rear window and the vehicle body. Between the lateral areas of the rear window and the C-columns and/or the upper area of the rear window and the folding roof, a sealing device is provided.

8 Claims, 2 Drawing Sheets

SWIVEL DEVICE FOR A REAR WINDOW

BACKGROUND AND SUMMARY OF THE INVENTION

This application claims the priority of German patent 197 53 209.8-21, filed Dec. 1, 1997, the disclosure of which is expressly incorporated by reference herein.

The invention relates to a swivel device for a rear window of a vehicle having a folding roof which extends between lateral vehicle columns, particularly A-columns and C-columns.

From German Patent Document DE-PS 1 146 767, a vehicle having a rear wall window is known which can be swivelled down into the vehicle. For this purpose, the upper and lower boundary edges of the rear wall window during the swivelling are forcibly guided separately from one another along different curved paths, the upper end of the window being guided in a straight line mechanism and the lower end being rotatably connected by way of a control arm with the vehicle body.

In the case of motor vehicles of a more modern construction, however, the depositing function of German patent document DE-PS 1 146 767 and particularly the depositing site cannot be implemented because the space behind the vehicle seats, where the window is to be deposited, is either already intended for the emergency seats or for the trunk.

Because of the completely different construction of the vehicle body, particularly in the area of the connection between the C-columns and the trunk, the depositing function described in German patent document DE-PS 1 146 767 having a straight line mechanism cannot be used in modern vehicles.

Furthermore, German Patent Document DE 34 44 593 A1 and German Patent Document DE 36 07 650 A1 describe devices for lowering the rear window of a motor vehicle. In this case, the rear window is essentially deposited in the vehicle interior by way of a translational movement.

However, such a translational movement requires high constructional expenditures and results in considerable additional costs during the manufacturing of the vehicle.

In German Patent Document DE-GM 92 11 365, a roof of a motor vehicle is described which can be moved between a normal position and a retracted position. A roof lamella is provided which has a common swivelling axis with a rear window. However, these two parts can be swivelled independently of one another.

German Patent Document DE 196 35 537 C1, which is not a prior publication, describes a hardtop for a passenger car in the case of which sealing devices are provided between a rear part and a vehicle body part.

From practice, flexible plastic rear windows are known which, however, allow any third persons access to the vehicle interior.

It is an object of the present invention to provide a swivel device for a rear window of a vehicle with a folding top which is constructed to allow the rear window to be moved independently of the C-columns while requiring as little space as possible in the trunk of the vehicle, while maintaining the weathering resistance of the folding roof.

This and other objects have been achieved according to the present invention by providing a swivel device for a rear window of a vehicle having a folding roof which extends between lateral vehicle columns, the vehicle having a vehicle body and a trunk, the rear window being releasably connected in a lower area by way of the swivel device with the vehicle body, wherein the rear window can be deposited in the trunk by way of the swivel device, the rear window is releasably connected by way of connection devices with at least one of the vehicle columns and the folding roof, a sealing device being arranged between a lower area of the rear window and the vehicle body, said sealing device extending in the transverse direction of the vehicle, and a sealing device being provided between lateral areas of the rear window and at least one of the vehicle-columns, an upper area of the rear window, and the folding roof.

The detachable connection of the rear window with the vehicle body by way of a swivel device and the releasable connection of the rear window with the C-columns or the folding roof by way of connection devices allow the rear window to be opened up completely independently of the C-columns and thus of the folding top and to be deposited in the trunk of the vehicle by way of the swivel device. A landaulet position is therefore permitted which, in certain weather conditions, particularly in light rain, permits a partial opening of the vehicle without exposing the vehicle occupants to the weather conditions. Since the C-columns remain in the closed condition when the rear window is open, the stability of the folding roof is completely maintained.

The depositing of the rear window in the trunk permits the full utilization of the vehicle interior for the rear seats and, when there are no rear seats, permits a very short length of the whole vehicle. Very little space is lost as the result of the rear window being deposited in the trunk.

As the result of the sealing devices between the lower area of the rear window and the vehicle body as well as between the lateral area of the rear window and the C-columns, in the closed condition of the rear window, a reliably sealed occupant compartment is ensured.

In contrast to flexible plastic rear windows, the present construction offers a much better protection against theft.

Other objects, advantages and novel features of the present invention will become apparent from the following detailed description of the invention when considered in conjunction with the accompanying drawings.

DETAILED DESCRIPTION OF THE DRAWINGS

Figure 1:
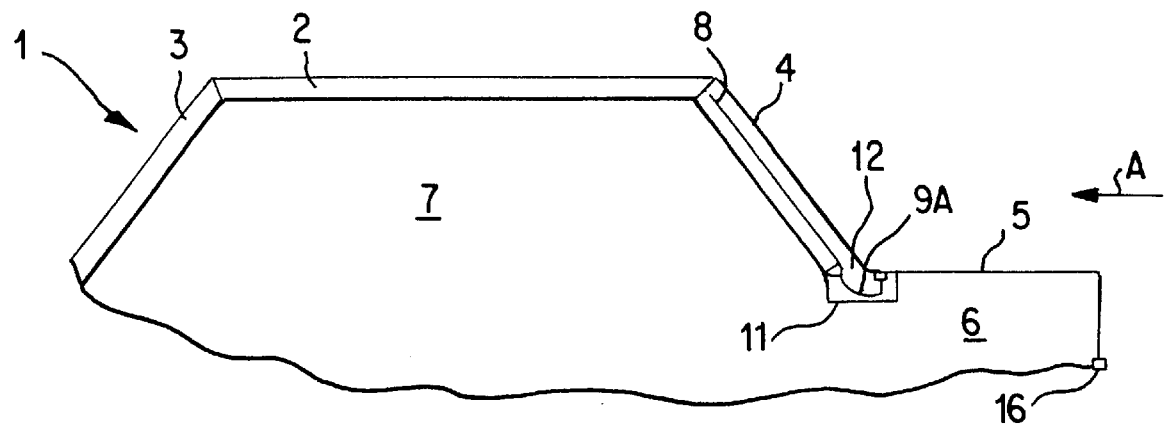
FIG. 1 is a schematic lateral view of a swivel device constructed as a curved hinge for a rear window of a vehicle having a folding roof, according to a preferred embodiment of the present invention.
Figure 2:
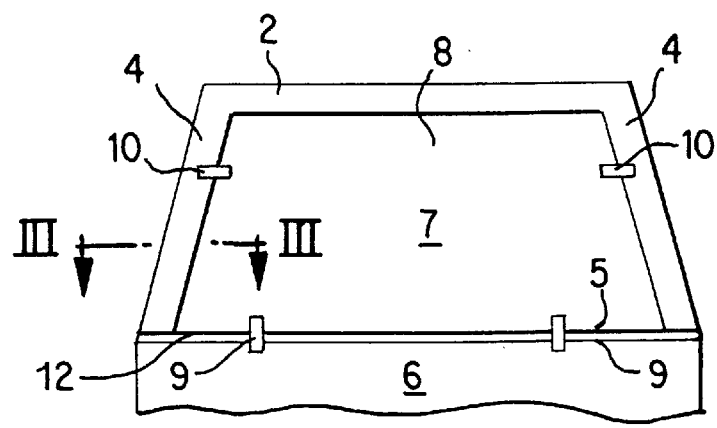
FIG. 2 is a view taken in the direction of arrow A of FIG. 1.
Figure 4:
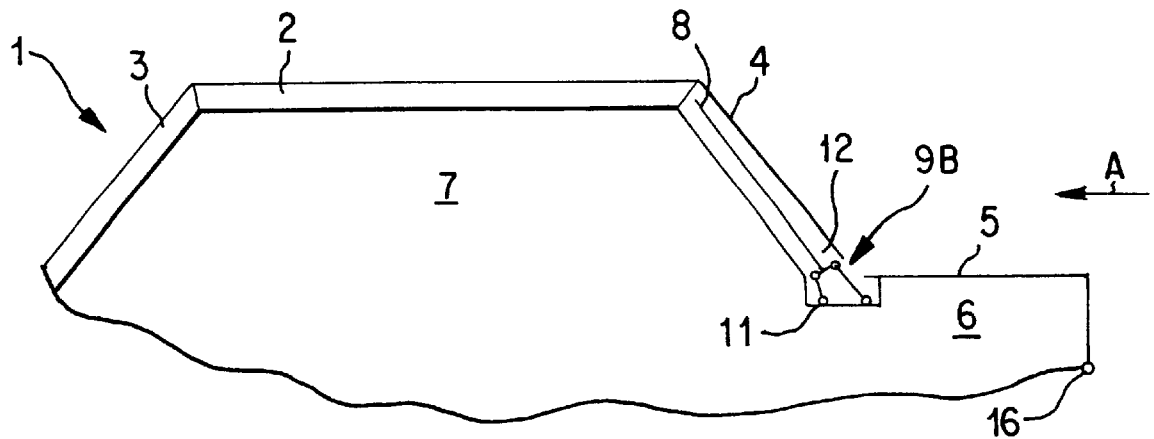
FIG. 4 is a schematic lateral view of a swivel device constructed as a multi-bar linkage for a rear window of a vehicle having a folding roof, according to a preferred embodiment of the present invention.

FIGS. 1, 2 and 4 illustrate a vehicle body 1 of a convertible which is not completely shown. In the upper area of the vehicle body 1, a folding roof 2 is situated which is constructed in a manner known per se and which extends from A-columns 3 by way of C-columns 4 to a trunk lid 5 of a trunk 6 and therefore defines a boundary of vehicle interior 7 in its closed condition.

A rear window 8 is mounted on the folding roof 2, which rear window 8 is not, as otherwise customary, fixedly connected with the folding roof 2, but is coupled with the vehicle body 1 via swivel devices 9A (FIG. 1) or 9B (FIG. 4). As illustrated in FIG. 2, the rear window 8 is releasably connected with the C-columns 4 via connection devices 10 located proximate an upper area of the rear window (reference number 10 being used in FIG. 2 to generically refer to either the connection device 10A shown in FIG. 3 or the connection device 10B shown in FIG. 5). As also shown in FIG. 2, two of the swivel devices 9 are used, arranged mirror-symmetrically with respect to a longitudinal center plane of the vehicle (reference number 9 being used in FIG. 2 to generically refer to either the swivel device 9A shown in FIG. 1 or the swivel device 9B shown in FIG. 4). One skilled in the art would recognize that various numbers and arrangements of the connection devices 10 and the swivel devices 9 may be used.

Thus, a lower area of the rear window 8 is pivotably connected with the vehicle body 1 by way of the swivel devices 9, and lateral areas of the rear window 8 are releasably connected with the C-columns 4 by way of the connection devices 10. Thus, by releasing the connection devices 10, the rear window 8 can be swivelled independently of the C-columns by way of the swivel devices 9. In order to ensure a space requirement which is as low as possible, a swivelling of the rear window 8 into the trunk 6 is provided.

According to the embodiment shown in FIG. 1, the swivel device is constructed as a curved hinge 9A. According to the embodiment shown in FIG. 4, the swivel device is constructed as a four bar linkage 9B. The present invention also contemplates other multi-bar linkages, for example a five or seven link design. One skilled in the art would recognize that the construction of the swivel devices 9 may be varied based on the specific geometrical configuration of the vehicle body 1 in the area of the connection of the rear window 8 with the trunk 6 to which the invention is being applied.

In the present embodiment, a rain trough 11 hinders a simple depositing of the rear window 8 in the trunk 6. Therefore the curved hinge 9A of FIG. 1 has a relatively complicated form, so the use of the four-bar mechanism 9B may be preferable since, in addition to the swivelling, a lifting movement must also be carried out to clear the rain trough 11.

A sealing device 12 is disposed between the lower area of the rear window 8 and the vehicle body 1. The sealing device 12 extends in the transverse direction of the vehicle body 1 and, in the closed position of the rear window 8, is used for sealing off the vehicle interior 7.

Figure 3:
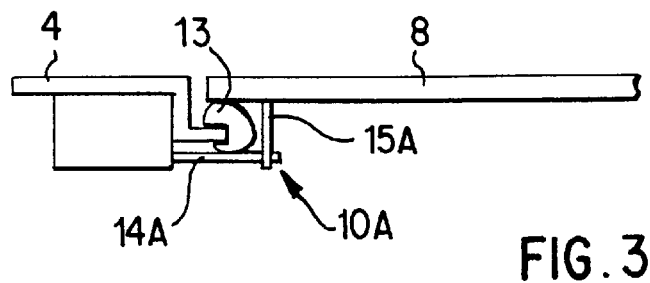
FIG. 3 is a sectional view taken along Line III—III of FIG. 2 showing one preferred embodiment of a connecting structure between the rear window and the vehicle body structure.

As illustrated in FIG. 3, additional sealing devices 13 are provided between each of the two C-columns 4 and the respective adjacent lateral area of the rear window 8. The sealing devices 13, in turn, seal off the vehicle interior 7 to the outside. In this case, the sealing device 13 also extends between the upper area of the rear window 8 and the folding roof 2, which, however, is not shown in the drawing.

FIG. 3 also illustrates one embodiment of the connection device 10A between the rear window 8 and the C-column 4. The connection device 10A has closing loops 14 which are each mounted in the left and right lateral area of the rear window 8, as well as closing pins 15 which are each mounted on the left and the right side of the C-column 4 and interact with the closing loop 14.

Figure 5:
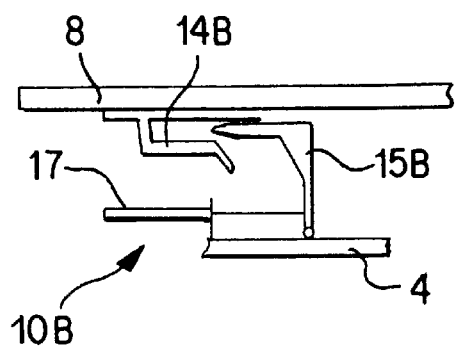
FIG. 5 is a view similar to FIG. 3 of another preferred embodiment of a connecting structure between the rear window and the vehicle body structure.

FIG. 5 shows another embodiment of the connection device 10B between the rear window 8 and the C-column 4. A locking eye 14B is connected to the rear window 8, and a locking bolt 15B is mounted on C-column 4. The locking bolt 15 is movable via a Bowden cable 17 to selectively couple and uncouple the rear window 8 and the C-column 4. The Bowden cable 17 may be controllable in a known manner via a central hydraulic system of the vehicle, or may be mannually movable.

As shown in FIG. 2, one connection device 10 is mounted on an upper area of each of the left and right C-column 4. However, for a more secure connection, additional connection devices 10 may also be provided which are distributed along the length of the C-column 4. In addition, it is contemplated to mount the closing loops 14 on the C-columns and to mount the closing pins 15 on the rear window 8. The connection devices may be formed of sheet metal, for example steel, or may be made of other materials or processes as would be understood by one skilled in the art.

In another embodiment which is not shown, the connection devices may also be arranged between the upper area of the rear window and the folding roof and may be provided with a sealing device.

The movement of the rear window 8 between the in-use position shown in FIGS. 1 and 4 and a stowed position in the trunk 6 is carried out as follows. Referring to FIGS. 1 and 4, in order to stow the folding roof 2 in the trunk 6, the trunk lid 5 is opened by rotating it clockwise about the trunk hinge 16. The connection devices 10 are also opened up by the movement of the closing pins 15A (FIG. 1) or locking bolts 15B (FIG. 4) out of the closing loops 14A (FIG. 1) or locking eyes 14B (FIG. 4), respectively. The rear window 8 is then pivoted clockwise about the swivel device 9 (curved hinge 9A of FIG. 1 or multi-bar linkage 9B of FIG. 4) and deposited in the trunk 6. The trunk lid 5 is then closed by rotating it counterclockwise about the trunk hinge 16. The rear window 8 can take up the space in a portion of the trunk 6 which is provided for stowing the folding roof 2 when it is opened. The movement of the rear window may be controlled via a control device which can be operated by the vehicle occupants, for example utilizing a hydraulic or an electric system of the vehicle. Alternatively, the movement of the rear window may be effected manually. In any event, during the movement of the rear window 8 the C-columns 4 and the folding roof 2 remain in their closed position and do not have to be moved.

In order to close the rear window 8 again, the above-described operation is carried out in the reverse order. Thus, the trunk lid 5 is opened first. Then the rear window 8 is swivelled via the swivel devices 9A or 9B out of the trunk 6 onto the C-columns 4. Finally, the trunk lid 5 is closed and the connection devices 10A or 10B are closed by engaging the closing pins 15A or locking bolts 15B in the closing loops 14A or locking eyes 14B, respectively.

The opening of the whole folding roof 2 takes place in the conventional manner, in the case of which the connection devices remain closed. If the folding roof 2 is to be opened up when the rear window 8 is in its open condition, the rear window 2 is first closed in order to then open up the whole folding roof 2 as customary.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Swivel device for a rear window of a vehicle having a folding roof which extends between lateral vehicle columns, the vehicle having a vehicle body and a trunk, the rear window being releasably connected in a lower area by way of the swivel device with the vehicle body, wherein the rear window is deposited in the trunk by way of the swivel device, the rear window is releasably connected by way of connection devices with at least one of the vehicle columns and the folding roof, a first sealing device being arranged between said lower area of the rear window and the vehicle body, said sealing device extending in the transverse direction of the vehicle, and a second sealing device being provided between lateral areas of the rear window and the vehicle-columns, or an upper area of the rear window, and the folding roof.

2. Swivel device according to claim 1, wherein the swivel device is constructed as a curved hinge.

3. Swivel device according to claim 1, wherein the swivel device is constructed as a four-bar mechanism.

4. Swivel device according to claim 1, wherein the swivel device is formed by a hinge pin.

5. Swivel device according to claim 1, wherein the connection devices each have a closing loop and a closing pin interacting with the closing loop.

6. Swivel device according to claim 5, wherein a respective one of said closing loops is arranged in left and right lateral areas of the rear window, and a respective one of said closing pins is arranged on left and right ones of said vehicle columns.

7. Swivel device according to claim 5, wherein a respective one of said closing pins is arranged in left and right lateral areas of the rear window, and a respective one of said closing loops is arranged on left and right ones of said vehicle columns.

8. Swivel device according to claim 1, wherein said folding roof extends between A-columns and C-columns, and wherein the rear window is releasably connected by way of the connection devices with the C-columns.

* * * * *